United States Patent [19]
McFarland et al.

[11] 3,826,911
[45] July 30, 1974

[54] CATOPTRIC LENS ARRANGEMENT

[75] Inventors: Philip J. McFarland, Lynnfield; Werner R. Rambauske, Carlisle, both of Mass.

[73] Assignee: Raytheon Company, Lexington, Mass.

[22] Filed: July 2, 1973

[21] Appl. No.: 376,052

[52] U.S. Cl....... 240/41.35 R, 240/44.1, 240/62.51, 240/103 R
[51] Int. Cl............................................. F21v 7/00
[58] Field of Search.......... 240/41.35, 49, 44.1, 103

[56] References Cited
UNITED STATES PATENTS

| | | | |
|---|---|---|---|
| 2,342,721 | 2/1944 | Buerner | 240/41.35 D X |
| 2,846,663 | 8/1958 | Heehler et al. | 240/49 X |
| 3,266,014 | 8/1966 | Leotta | 240/49 X |

Primary Examiner—Richard M. Sheer
Attorney, Agent, or Firm—Philip J. McFarland; Joseph D. Pannone

[57] ABSTRACT

Improved catoptric lens arrangements are shown wherein a beam may be formed from light emitted by a plurality of sources of light, the intensity and direction of such beam being automatically controlled in response to the speed and direction of travel of a motor vehicle carrying such arrangements.

4 Claims, 4 Drawing Figures

CATOPTRIC LENS ARRANGEMENT

BACKGROUND OF THE INVENTION

This invention pertains generally to catoptric lens arrangements and particularly to arrangements of such sort for forming a steerable beam.

It is known in the art that the conventional automobile headlamp utilizes a combination of catoptric elements and dioptric elements to form a beam from a source of finite dimensions, as an incandescent filament. While such headlamps may be designed to form a beam of satisfactory shape, several theoretical considerations make it almost impossible to obtain a completely satisfactory headlamp. First of all, it is evident that the use of more than one incandescent filament in a conventional headlamp means, at best, that two differently oriented beams are formed. Therefore, when it is necessary that the intensity of the beam be increased to provide an adequate beam for high speed driving, one pair of conventional headlamps is insufficient. Thus, all automobiles use "low" and "high" headlamps. There is no difference between the two except in the way in which they are secured to the body of the automobile, the "high" headlamp being adjusted so that the centerline of its beam is higher than the centerline of the beam of the "low" headlamp. Both the "high" and the "low" headlamps now used in automobiles are, once adjusted, fixed in position relative to the body of the automobile. Thus, beam direction relative to the automobile may not easily be changed.

SUMMARY OF THE INVENTION

Therefore, it is an object of this invention to provide an improved catoptric lens arrangement for incorporation in the headlamp of an automobile;

Another object of this invention is to provide an improved catoptric lens arrangement wherein a multiplicity of light sources are installed, such sources being selectively energized to form a single beam whose direction and shape are substantially constant regardless of which of such sources are energized;

Another object of this invention is to provide an improved catoptric lens arrangement for the headlamp of an automobile, the brightness of the beam from such an arrangement increasing automatically with increasing speed of the automobile; and Still another object of this invention is to provide an improved catoptric lens arrangement whereby the direction of the beam from a headlamp of an automobile may be steered in response to actuation of the steering mechanism of the automobile.

As used hereinafter, the term *Rambauske mirrors* means at least a pair of mirrors wherein the generatrices of the reflecting surfaces are sections of curves having a focal point moved relative to a reference line to cause the locus of each one of the focal points to be a *focal curve;* in a catoptric lens arrangement, two, or more, Rambauske mirrors may be positioned so that their *focal curves* are coincident, i.e., confocal, or spaced one from another in a predetermined manner.

The foregoing and other objects of this invention are generally attained by providing at least a pair of Rambauske mirrors having diverging reflecting surfaces to form a composite beam of light from the light emitted by a plurality of light sources disposed between such mirrors. The longitudinal axis of each component beam in such composite beam is substantially parallel to a common axis. In one embodiment of this invention, means are provided to control the intensity of selected ones of the plurality of light sources in accordance with the speed of the automobile and, if one or more of the selected light sources should become inoperative, to energize and control spare ones of such sources. In another embodiment means are provided to change the direction of the composite beam in accordance with the actuation of the steering mechanism of the automobile.

BRIEF DESCRIPTION OF THE DRAWINGS

For a more complete understanding of this invention, reference is now made to the following description of preferred embodiments of this invention illustrated in the accompanying drawings, wherein.

DESCRIPTION OF THE PREFERRED EMBODIMENTS

Before referring to the Figures, it should be noted that only those portions of an automobile which are necessary to an understanding of this invention have been illustrated. It is deemed obvious that portions of an automobile such as the supporting structure for the illustrated elements of the contemplated arrangements may be provided by a person of skill in the art.

Figure 1:
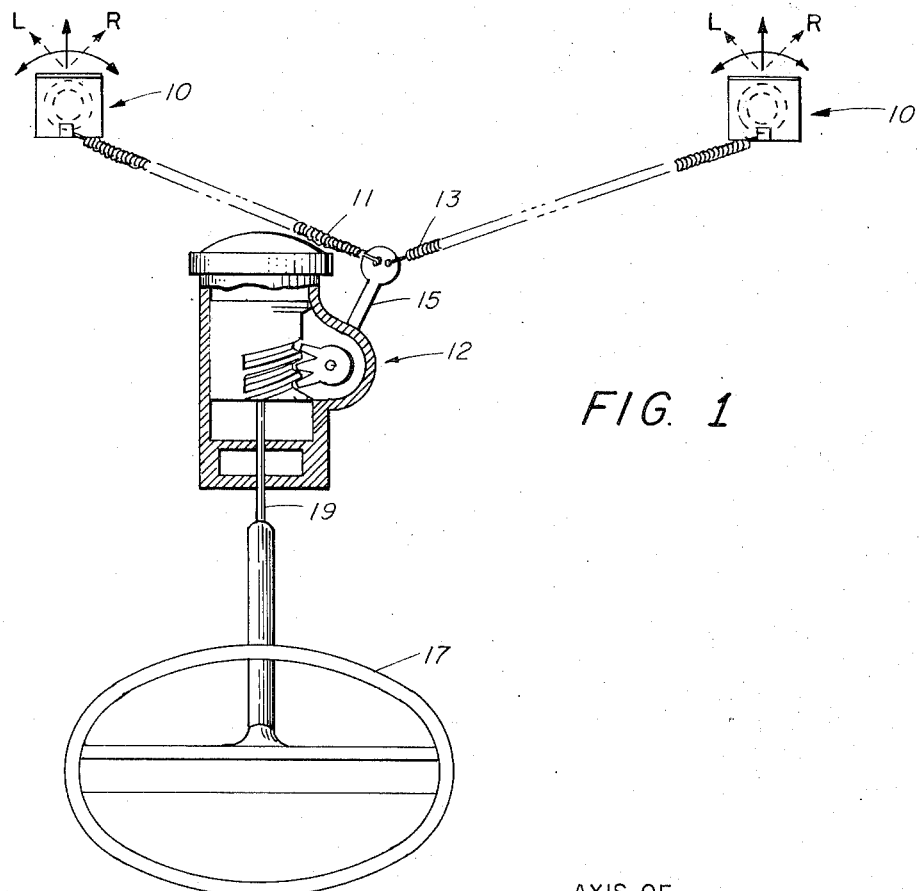
FIG. 1 is a simplified sketch illustrating schematically the manner in which the steering mechanism of an automobile may, according to this invention, steer the beams from headlamps.
Figure 1A:
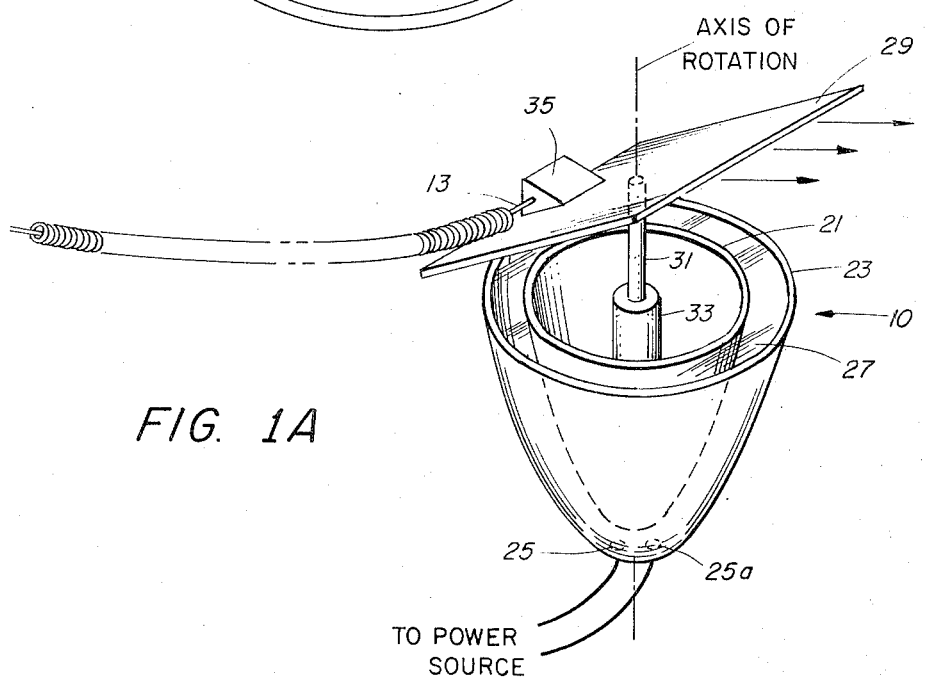
FIG. 1A is an isometric view of the headlamp for an automobile, shown in plan view of FIG. 1.

Referring now to FIGS. 1 and 1A, it may be seen that the beams from a pair of headlamps 10 may be directed by means of a pair of flexible cables 11, 13 connected between a conventional steering mechanism 12 and such headlamps. Thus, one end of each one of the flexible cables 11, 13 is connected to a conventional Pitman crank 15 and the second end of each one of such cables is connected to a different one of the headlamps 10. The Pitman crank 15 in turn is rotated in accordance with the turning of a steering wheel 17 operating through a steering shaft 19 and a rack and pinion (not numbered) in the steering mechanism 12. As may more clearly be seen in FIG. 1A, each one of the headlamps 10 is made up of a pair of Rambauske mirrors 21, 23 between which a plurality of incandescent lamps, here two incandescent lamps 25, 25a are disposed. The Rambauske mirrors are supported with respect to each other by a lamination 27 of a transparent material. It is noted in passing that the illustrated lamination for supporting the Rambauske mirrors 21, 23 with respect to each other may be replaced by any desired support means because the refractive properties of the transparent material are not utilized. A beam directing mirror 29 is affixed to a rotatable shaft 31 in any convenient manner so that the refractive surface of such mirror covers the exit aperture (not numbered) between the Rambauske mirrors 21, 23. The rotatable shaft 31 in turn is mounted in a bearing 33 affixed in any convenient manner to the nonreflective side of the Rambauske mirror 21. A block 35, affixed in any convenient manner to the beam directing mirror 29, serves to secure one end of one of the flexible shafts, here flexible shaft 13.

Light from either, or both, incandescent lamps 25, 25a is reflected back and forth between the opposing reflecting surfaces of Rambauske mirrors 21, 23 so that the direction of all rays approaches the direction of an ideal ray. An ideal ray here is a ray, which after reflection from the surface of Rambauske mirror 23, is parallel to the axis of symmetry of such mirror. The generatrices of the Rambauske mirrors 21, 23 are, therefore, segments of parabolas for reasons set forth in detail in the application entitled "Catoptric Lens Arrangement" filed contemporaneously herewith by the inventors hereof and assigned to the same assignee. With the longitudinal axis of the rotatable shaft 31 coincident with the axis of symmetry of the Rambauske mirrors 21, 23, it is apparent in FIG. 1A that the beam steering mirror 29 may be inclined so as to redirect the light coming from the aperture between the Rambauske mirrors 21, 23 in a direction substantially orthogonal to the axis of symmetry of the Rambauske mirrors 21, 23. Further, it is obvious that if the beam directing mirror 29 is rotated because of movement of the flexible shaft 13, the redirected beam will be rotated in a plane orthogonal to the axis of rotation. It follows, then, that in an automobile the Rambauske mirrors should be mounted so that their axis of symmetry is substantially orthogonal to the desired beam direction.

Figure 2:
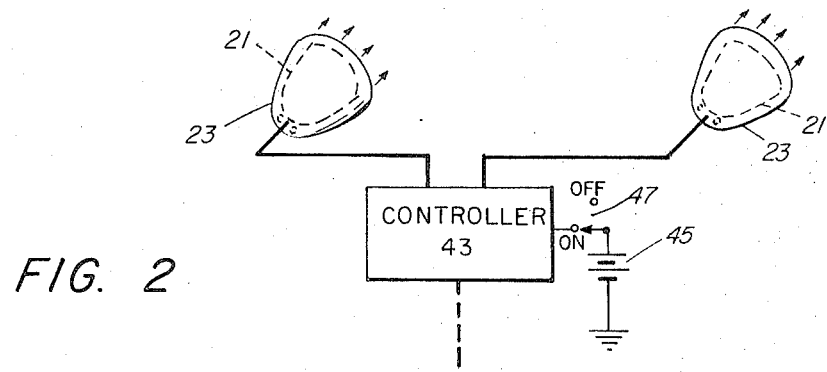
FIG. 2 is a simplified sketch illustrating schematically the manner in which the brightness of the beams of a pair of automobile headlamps may be controlled.
Figure 2A:
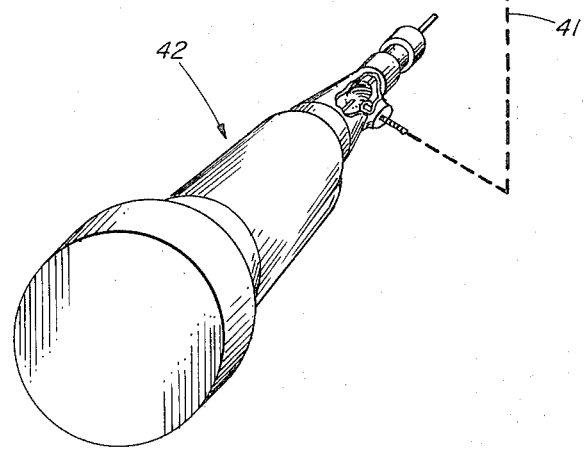
FIG. 2A is a schematic diagram of a control circuit for use in the arrangement shown in FIG. 2.
Figure 2A:
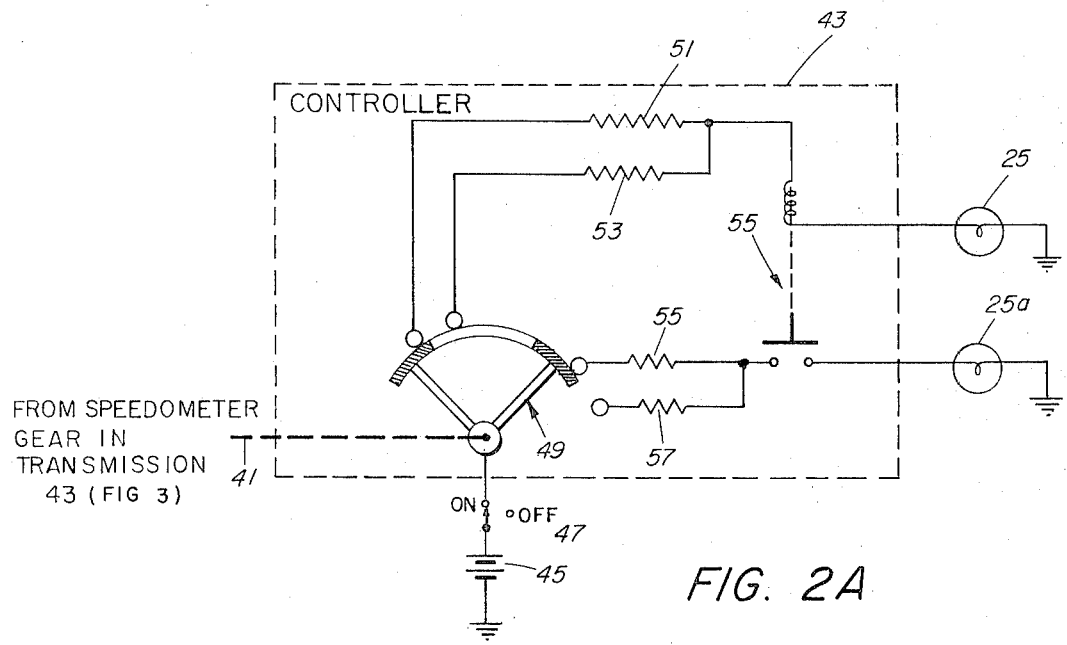

Referring now to FIGS. 2 and 2A, it may be seen that the brightness of the beam from a pair of headlamps may be controlled in accordance with the speed of an automobile by rotation of a flexible shaft 41 actuated by a conventional gearing arrangement (not numbered) in the automobile's transmission 42. Here the headlamps may conveniently be the lower portion of the headlamp 10 shown in FIG. 1A. That is, the headlamps may consist of Rambauske mirrors 21, 23, between which are mounted a plurality of incandescent lamps as in FIG. 1A. The flexible shaft 41 actuates a controller 43, to which is also connected a power source 45 through a conventional on/off switch 47.

An exemplary form of the controller 43 is shown in FIG. 2A. Thus, the power source 45 is connected through the on/off switch 47 to a rotary switch 49. The latter has two conductive segments (not numbered) and is adapted to be rotated in a clockwise direction by the flexible shaft 41 as the forward speed of the automobile increases. Here two pairs of contacts (not numbered but associated with the rotary switch 49) are connected as shown to resistors 51, 53, 55, 57. Resistors 51, 53 further are connected as shown through the actuating coil of a solenoid 55 to incandescent lamp 25. Resistors 55, 57 are connected through the contacts of the solenoid 55 to incandescent lamp 25a. Both of the incandescent lamps 25, 25a are returned to the power source 45.

It may be seen that if the rotary switch 49 is in the position it would assume if the automobile were stationary and the on/off switch 47 is in its "on" position, a complete electrical circuit between the power source 45 and the incandescent lamp 25 would exist. The contacts of the solenoid 55 (which obviously are normally open when such solenoid is energized) breaks the electrical circuit between the power source 45 and the incandescent lamp 25a. It may be seen, therefore, that if the filament of the incandescent lamp 25 should rupture solenoid 55 would be de-energized and its contacts would then move to position to complete an electrical circuit between the power source 45 and the incandescent lamp 25a.

As the automobile is caused to move forward the flexible shaft 41 in turn causes the rotary switch 49 to move so that resistors 53, 57 are in circuit along with resistors 51, 55. This means then that the current supplied to either incandescent lamp 25 or incandescent lamp 25a is increased, thereby increasing the brightness of the beam.

It will be immediately apparent to one of skill in the art that the illustrated embodiments of this invention may be changed in many ways without departing from our inventive concepts. For example, the number of incandescent lamps may be changed in either illustrated embodiment or the two embodiments could be combined. It is felt, therefore, that the invention should not be restricted to its disclosed embodiments but rather should be limited only by the spirit and scope of the appended claims.

We claim:

1. Beam forming apparatus mounted on a motor vehicle for combining rays of light from each one of a plurality of light sources into a composite beam and for changing the direction of such composite beam, such apparatus comprising:
   a. a pair of confocal mirrors, one having a concave reflecting surface and the other having a convex reflecting surface, disposed about an axis of symmetry to define a divergent channel for rays of light;
   b. a planar mirror disposed to reflect all rays of light emanating from the divergent channel; the reflecting surface of such planar mirror being inclined at an angle of 45° with respect to the axis of symmetry;
   c. at least a pair of light sources disposed within the divergent channel adjacent to the axis of symmetry, substantially all rays of light from each one of such light sources, in passing through the divergent channel, being reflected back and forth between the pair of confocal mirrors to form a composite beam;
   d. means for rotating the planar mirror about the axis of symmetry; and
   e. means for independently varying the intensity of each one of the light sources.

2. Beam forming apparatus as in claim 1 wherein the generatrices of the concave and the convex reflecting surfaces are confocal parabolas, the common focal point of such parabolas being spaced from the axis of symmetry.

3. Beam forming apparatus as in claim 2 wherein the means for rotating the planar mirror is responsive to the direction of movement of the motor vehicle.

4. Beam forming apparatus as in claim 3 wherein the means for independently varying the intensity of each one of the light sources is responsive to the speed of the motor vehicle.

* * * * *